United States Patent
Zerginyi et al.

[15] 3,681,502
[45] Aug. 1, 1972

[54] DIURETIC AND SALURETIC COMPOSITION AND METHOD CONTAINING 5-(2-METHYLENE-ALKANOYL)-BENZOFURAN COMPOUNDS

[72] Inventors: Janos Zerginyi, Riehen; Ernst Habicht, Oberwil, both of Switzerland

[73] Assignee: Ciba-Geigy Corporation, Ardsley, N.Y.

[22] Filed: Aug. 19, 1970

[21] Appl. No.: 65,343

Related U.S. Application Data

[62] Division of Ser. No. 746,262, July 22, 1968, Pat. No. 3,580,931.

[52] U.S. Cl. .................424/285, 424/244, 424/274
[51] Int. Cl. ..........................A01n 9/28, A61k 27/00
[58] Field of Search.......................424/274, 244, 285

[56] References Cited

UNITED STATES PATENTS 2,680,119   6/1954   Robertson ................260/346.2
3,394,125   7/1968   Crenshaw ................424/285 X

*Primary Examiner*—Albert T. Meyers
*Assistant Examiner*—Dale R. Ore
*Attorney*—Karl F. Jorda and Bruce M. Collins

[57] ABSTRACT

A method of producing a diuretic and saluretic effect in mammals comprising administering 5-(2-methylene-alkanoyl)-benzofuran compounds to said mammals and pharmaceutical compositions containing said compounds. A typical embodiment is 5-(2-methylene-butyryl)-6-methyl-benzofuran-2-carboxylic acid.

20 Claims, No Drawings

DIURETIC AND SALURETIC COMPOSITION AND METHOD CONTAINING 5-(2-METHYLENE-ALKANOYL)-BENZOFURAN COMPOUNDS

This application is a division of application Ser. No. 746,262, filed July 22, 1968, now U.S. Pat. No. 3,580,931.

DETAILED DESCRIPTION

The present invention pertains to heterocyclic carboxylic acids, processes for the production thereof, a method of producing a diuretic and saluretic effect as well as pharmaceutical compositions.

More particular, the present invention pertains to heterocyclic carboxylic acids of the Formula I

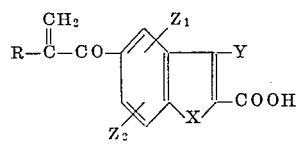

wherein
R is hydrogen or lower alkyl;
X is oxygen, sulfur, the imino or the methylimino group;
Y is hydrogen, methyl, fluoro, chloro or bromo, and each of $Z_1$ and $Z_2$ taken individually is hydrogen, lower alkyl, lower alkoxy, fluoro, chloro or bromo, as well as to the pharmaceutically acceptable salts thereof with a base.

These compounds have been found to possess valuable pharmacological properties. In particular, they have a diuretic and saluretic activity. These properties characterize the compounds of the invention suitable for the treatment of disturbances which are due to insufficient excretion of urine and of electrolytes, especially of sodium chloride. Such disturbances are the cause of oedema and hypertension. The new substances administered orally in low doses increase the excretion of uria and of sodium and chlorine ions to a considerable extent.

In the heterocyclic carboxylic acids of Formula I, $Z_1$ occupies the 4- or 6-position and $Z_2$ the 6- or 7-position of the heterocyclic ring. By the term lower alkyl and the derivation thereof using the root "alk," namely alkoxy, is intended a group comprising a straight or branched hydrocarbon chain of from one to four carbon atoms. Representative of lower alkyl groups are thus, e.g. the methyl, ethyl, propyl, isopropyl, butyl or tert. butyl group. Embraced by the term lower alkoxy are such groups as the methoxy, ethoxy, propoxy, isopropoxy, butoxy or the sec. butoxy group.

Compounds of Formula I are produced according to a first process by decomposing a compound of Formula II

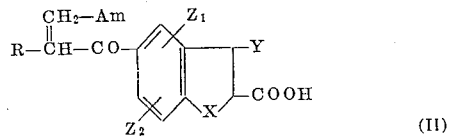

wherein R, X, Y, $Z_1$ and $Z_2$ have the meanings given in Formula I, and Am is the radical of a secondary amine, said secondary amine of Formula III H—Am   (III)

wherein Am is split off. If desired, the reaction product of Formula I is converted into a pharmaceutically acceptable salt with an inorganic or organic base in a conventional manner.

As radical of a secondary amine, Am can be, e.g. the dimethylamino, diethylamino, 1-pyrrolidino, 1-piperidino, 1-hexahydro-1H-azepino or the morpholino group.

A compound of Formula II is preferably decomposed by heating in the presence of a weak base in a solvent containing hydroxyl groups. Examples of weak bases are sodium acetate or sodium hydrogen carbonate. Examples of solvents containing hydroxyl groups are glacial acetic acid and water.

Compounds of Formula II are produced, for example, as follows: Carboxylic acids of Formula IV, which are also starting materials for the second process according to the invention, are condensed according to Friedel-Crafts in the presence of aluminum chloride in nitrobenzene with carboxylic acid chlorides of Formula IVa R—CH$_2$—COCl   (IVa)

wherein R has the meaning given in Formula I, to form the corresponding 5-alkanoyl derivatives. Such 5-alkanoyl derivatives are, e.g. the 5-acetyl, 5-propionyl, 5-butyryl, 5-valeryl or 5-isovaleryl derivatives of benzofuran-2-carboxylic acid, of benzo[b]thiophene-2-carboxylic acid, of indole-2-carboxylic acid or of 1-methyl-indole-2-carboxylic acids which, optionally are substituted by the radicals Y, $Z_1$ and/or $Z_2$. The 5-alkanoyl derivatives mentioned are then converted into the corresponding Mannich derivatives with the aid of formaldehyde or paraformaldehyde and a secondary organic amine.

Compounds of Formula I are produced by a second process according to the invention by reacting, according to Friedel-Crafts, a compound of Formula IV

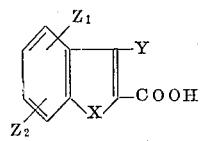

wherein X, Y, $Z_1$ and $Z_2$ have the meanings given in Formula I, with a carboxylic acid halide of Formula V

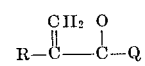

or with a carboxylic acid anhydride of Formula VI

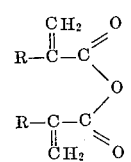

wherein R has the meaning given in Formula I, and Q is halogen.

If desired, the reaction product of Formula I is converted into a pharmaceutically acceptable salt with an inorganic or organic base in a conventional manner.

As halogen, Q is preferably chlorine or bromine. Suitable catalysts for the reaction according to Friedel-Crafts are, e.g. aluminum chloride, stannic chloride, zinc chloride, concentrated sulfuric acid, phosphoric acid, polyphosphoric acid or pyrophosphoric acid, containing hydroxyl groups. The acids are used, preferably, when a carboxylic acid anhydride is the acylating agent. The reaction is preferably performed in a solvent, such as, e.g. aliphatic or cycloaliphatic hydrocarbons such as heptane or cyclohexane, nitrated hydrocarbons such as nitromethane, nitrocyclohexane or nitrobenzene, halogenated hydrocarbons such as carbon tetrachloride, ethylene chloride, methylene chloride, or o-dichlorobenzene, and carbon disulfide.

Compounds of Formula II wherein X, Y, $Z_1$ and $Z_2$ have the meanings given in Formula I are described in the literature, e.g. benzofuran-2-carboxylic acid [cf. R. Fittig et al., Ann. Chem. 216, 162 (1883)], benzo[b]thiophene-2-carboxylic acid [cf. P. Friedlunder et al., Chem. Ber. 45, 2087 (1912)], indole-2-carboxylic acid [cf. W. Madelung, Chem. Ber. 45, 3521(1912)], 4-chloroindole-2-carboxylic acid (cf. H.N. Rydon et al., J. Chem. Soc. 1955, 3499) and 1-methyl-indole-2-carboxylic acid [cf. E. Fischer et al., Chem. Ber. 16, 2245 (1883)]. Other compounds of this type can be produced in analogy to the literature references cited.

Compounds of Formula I are produced by a third process according to the invention by simultaneously saponifying the ester group and splitting off the secondary organic amine from a compound of Formula VII

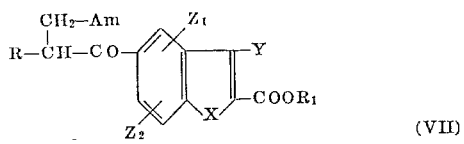

(VII)

wherein R, X, Y, $Z_1$ and $Z_2$ have the meanings given in Formula I, Am has the meaning given in Formula II and $R_1$ is a lower alkyl or the benzyl group. If desired, the reaction product of Formula I is converted into a pharmaceutically acceptable salt with an inorganic or organic base in a conventional manner.

This simultaneous saponification and splitting reaction is preferably performed by shortly boiling the compound of Formula VII in an aqueous alkanol in the presence of an alkali or alkaline earth metal hydroxide or carbonate.

Compounds of Formula VII, are produced e.g. by esterifying a compound of Formula II with a lower alkanol or benzyl alcohol. This esterification has to be carried out under mild conditions so that the secondary amino group is not split off. The compounds of Formula VII are also produced by acylating according to Friedel-Crafts a lower alkyl or benzyl ester of Formula IV with an acid chloride of Formula IVa. The so obtained ester is then converted into the corresponding Mannich derivative of Formula VII by reaction with formaldehyde or paraformaldehyde and a secondary amine.

Compounds of Formula I are produced by a fourth process according to the invention by saponifying in conventional manner a compound of Formula VIII

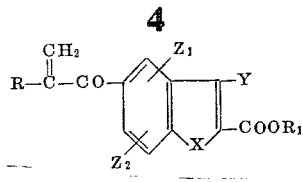

(VIII)

wherein R, X, Y, $Z_1$ and $Z_2$ have the meanings given in Formula I and $R_1$ has the meaning given in Formula VII.

If desired, the reaction product of Formula I is converted into a pharmaceutically acceptable salt with an inorganic or organic base in conventional manner.

This saponification is, e.g., carried out in a solvent containing hydroxyl groups in the presence of an alkali or alkaline earth metal hydroxyde or carbonate.

Compounds of Formula VIII are produced by heating a compound of Formula VII in the presence of a weak base, in a solvent containing hydroxyl groups, in a way as described in the first process of this invention. Sodium acetate and sodium hydrogen carbonate which do not saponify the ester function can be used as weak bases. Water or lower fatty acids such as glacial acetic acid can be used as solvents.

Compounds of Formula I are produced by a fifth process according to the invention by splitting off hydrogen halide from a compound of Formula IX

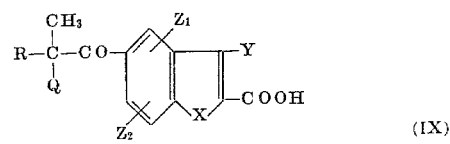

(IX)

wherein R, X, Y, $Z_1$ and $Z_2$ have the meanings given in Formula I and Q has the meaning given in Formula V.

If desired, the reaction product of Formula I is converted into a pharmaceutically acceptable salt with an inorganic or organic base in a conventional manner.

As halogen atom Q is preferably chlorine or bromine. The elimination of hydrogen halide is carried out e.g. by boiling the compound of Formula IX in an organic base, such as collidine or in dimethyl formamide. Hydrogen halide can also be eliminated by boiling a compound of Formula IX in an organic solvent such as benzene or toluene in the presence of silver acetate or by boiling in dimethyl formamide in the presence of lithium bromide or carbonate.

The compounds of Formula IX used as starting materials can be produced in analogy to the second process of this invention by condensing a compound of Formula IV, according to Friedel-Crafts, in nitrobenzene in the presence of aluminum chloride, with a carboxylic acid chloride of Formula IXa

(IXa)

wherein R has the meaning given in Formula I and Q the meaning given in Formula V. The compounds of Formula IX can also be produced by chlorinating or brominating a compound of Formula IXb

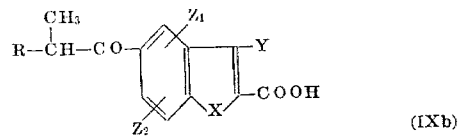

(IXb)

wherein R, X, Y, $Z_1$ and $Z_2$ have the meanings given in Formula I. The production of the compounds of Formula IXb is described in the first process of this invention. The chlorination or bromination is, e.g. carried out by adding the equimolar amount of chlorine or bromine to the stirred solution of the compound of Formula IXb in an appropriate solvent such as glacial acetic acid, nitrobenzene or a halogenated hydrocarbon.

Compounds of Formula I are produced by a sixth process according to the invention by treating a compound of Formula X

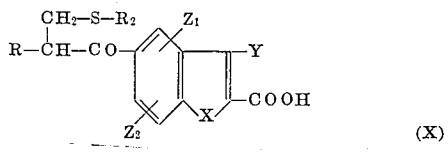

wherein R, X, Y, $Z_1$ and $Z_2$ have the meanings given in Formula I and $R_2$ represents a lower alkyl group with an alkylating agent of Formula Xa $$R_2—A \qquad (Xa)$$

wherein $R_2$ has the meaning given in Formula X and A is the monovalent anion of a mineral acid, to give the ternary sulfonium compound of Formula Xb

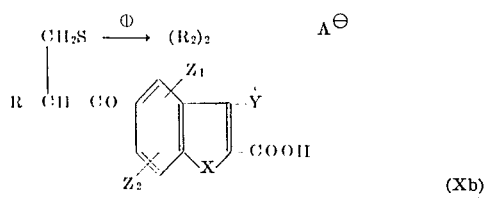

wherein R, X, Y, $Z_1$ and $Z_2$ have the meanings given in Formula I, $R_2$ has the meaning given in Formula X and A the meaning given in Formula Xa, and boiling this compound in the presence of a weak base until the sulfonium group is split off. If desired, the reaction product of Formula I is converted into a pharmaceutically acceptable salt with an inorganic or organic base in a conventional manner.

Alkyl halides and dialkylsulfates can be used as alkylating agents. The elimination of the ternary sulfonium group is performed under similar conditions as the elimination of the secondary amine as described in the first process of this invention, i.e. by heating the compound of Formula Xb in the presence of a weak base such as sodium acetate or sodium hydrogen carbonate in a solvent containing hydroxyl groups like water or lower fatty acids.

The compounds of Formula X can be produced e.g. by boiling, in a buffered aqueous solution of pH 7-9, a compound of Formula II, or a salt of such a compound with a hydrogenhalide, with an excess of a sodium lower alkyl sulfide of the Formula Xc $$Na—S—R_2 \qquad (Xc)$$

wherein $R_2$ has the meaning given in Formula X, until the secondary amine is replaced by the alkylsulfide group.

Compounds of Formula I are produced by a seventh process according to the invention by splitting off the alkylsulfonyl group of a compound of Formula XI

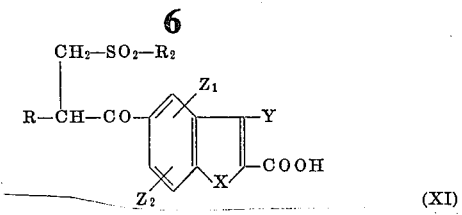

wherein R, X, Y, $Z_1$ and $Z_2$ have the meanings given in Formula I and $R_2$ has the meaning given in Formula X, by boiling this compound in the presence of a weak base in a solvent containing hydroxyl groups. If desired, the reaction product of Formula I is converted into a pharmaceutically acceptable salt with an inorganic or organic base in a conventional manner.

Sodium acetate or sodium hydrogen carbonate can be used as weak bases. As solvents are preferably used water or lower fatty acids.

The compounds of Formula XI can be easily produced by treating a compound of Formula X in an organic solvent with a per acid or hydrogen peroxide. Per acids suitable for this oxidation are, e.g., performic acid peracetic acid or perbenzoic acid. Lower alcohols, lower ketones or lower fatty acids are convenient solvents for this reaction.

For the formation of pharmaceutically acceptable salts can be used inorganic or organic bases such as alkali or alkaline earth hydroxides, carbonates or bicarbonates. Suitable are thus, e.g. sodium, potassium, magnesium and calcium hydroxides, carbonates or bicarbonates, as well as choline and triethanolamine. Such salts are produced e.g. by mixing the compound of Formula I with the equivalent amount of the desired base in a suitable solvent such as water, mixtures of water with an organic solvent or in organic solvents alone such as methanol, ethanol or propanol and isolating the salts formed in a conventional manner.

The compounds of the invention have been found to have valuable pharmacological properties, especially diuretic and saluretic activities combined with a very low order of toxicity. These favorable properties render the compounds of Formula I and their pharmaceutically acceptable salts with inorganic or organic bases suitable for the treatment of disturbances which are due to insufficient excretion of urine and of electrolytes, particularly of sodium chloride. Such disturbances are the cause of oedema and hypertension.

The diuretic and saluretic effects of the compounds of the invention are illustratively demonstrated in dogs and rabbits. Thus it can be shown by conventional pharmacological experiments that 5-(2-methylene-butyryl)-6-methyl-benzofuran-2-carboxylic acid, 5-(2-methylene-butyryl)-4-chloro-indole-2-carboxylic acid and 5-(2-methylene-butyryl)-4-chloro-benzo[b]thiophene-2-carboxylic acid administered orally or parenterally in amounts of 5 mg/Kg to dogs and rabbits increase the excretion of urine and simultaneously of sodium chloride to a considerable extent, whereby no undesirable side effects are observed.

The new active substances or the pharmaceutically acceptable salts thereof are preferably administered orally.

The daily dosages vary between 50 and 1,000 mg for mammals. Suitable dosage units such as dragees and tablets, preferably contain 25–500 ml of an active substance according to the invention, i.e. 20 to 80 percent of a compound of Formula I. They are produced by combining the active substance, e.g. with solid pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols, to form tablets or dragee cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between varying dosages of active substance.

The following examples further illustrate the production of the new compounds of Formula I and of hitherto undescribed intermediate products as well as the production of pharmaceutical compositions but they are by no means the sole methods of producing same. The temperatures are given in degrees Centigrade.

EXAMPLE 1 a. 2.3 g of 5-butyryl-benzofuran-2-carboxylic acid, 0.5 g of paraformaldehyde and 1.0 g of dimethylamine hydrochloride are slurried in 20 ml of dioxan and the whole is refluxed for 5 hours while stirring. The reaction mixture is cooled and evaporated to dryness in vacuo. 30 ml of glacial acetic acid and 3.0g of anhydrous sodium acetate are added to the crude 5-(2-dimethyl-aminomethyl-butyryl)-benzofuran-2-carboxylic acid hydrochloride obtained and the mixture is refluxed for 2 hours. The solvent is then evaporated in vacuo, the residue is taken up in 50 ml of water and the aqueous solution is acidified with concentrated hydrochloric acid to pH 2–3. The hydrochloric acid suspension is stirred for half an hour. The precipitated crystals are then filtered off, washed with water, dried in vacuo at 60° and recrystallized from benzene/hexane. The 5-(2-methylene-butyryl)-benzofuran-2-carboxylic acid obtained melts at 128°–129°.

The 5-butyryl-benzofuran-2-carboxylic acid used as starting material is produced as follows:

b. 5.0 g of benzofuran-2-carboxylic acid [cf. R. Fittig et al., Ann. Chem.216, 162 (1883)] are suspended in 20 ml of nitrobenzene and the suspension is cooled to 0°. 12.0 g of pulverized aluminum chloride are added in portions to this suspension so that the temperature of the reaction mixture does not rise above 10°. 4.0 g of butyryl chloride are then added all at once. The mixture is then heated to room temperature while stirring. Stirring is continued for 24 hours at this temperature and then it is poured onto 100 g of ice in 20 ml of concentrated hydrochloric acid. The hydrochloric acid suspension is extracted twice with 100 ml of acetic acid ethyl ester each time, the acetic acid ethyl ester solution is washed with 50 ml of water and extracted twice with 50 ml of concentrated sodium hydrogen carbonate solution each time. The pH of the sodium hydrogen carbonate solution is adjusted to 3 with concentrated hydrochloric acid, the mixture is stirred for 30 minutes, the precipitated crude product is filtered off, the filter residue is dried in vacuo at 60° and recrystallized from benzene. 5-butyryl-benzofuran-2-carboxylic acid is obtained, M.P. 179°–181°.

EXAMPLE 2

8 g of 4-chloroindole-2-carboxylic acid (cf. H.N. Rydon et al., J. Chem. Soc. 1955, 3499) are slurried in 40 ml of nitrobenzene. The slurry is cooled to 0° and 20 g of pulverized aluminum chloride are added in portions so that the temperature never exceeds 10°. The suspension is cooled to 0° and 3 g of 2-methylene butyryl chloride are added all at once. The mixture is heated to 25° within 20 minutes, stirred for 45 minutes at this temperature and then poured onto 200 g of ice and 30 ml of concentrated hydrochloric acid. The hydrochloric acid suspension is extracted twice with 100 ml of ether each time. The ether extract is washed with water and extracted twice with 50 ml of concentrated sodium hydrogen carbonate solution each time. The sodium hydrogen carbonate solution is acidified with concentrated hydrochloric acid to pH 2–3 and the precipitated crude product is extracted with ether. The ether solution is dried over magnesium sulphate, concentrated and the residue is purified by chromatography on silica gel using benzene/ether/glacial acetic acid(900:80:20) as eluent. The 4-chloro-5-(2-methylene-butyryl)-indole-2-carboxylic acid obtained melts at 191°–192°.

EXAMPLE 3 a. Crude 3,4-dichloro-5-(2-dimethylaminomethyl-butyryl)-indole-2-carboxylic acid hydrochloride is obtained analogously to example 1 (a) starting from 3,4-dichloro-5-butyryl-indole-2-carboxylic acid with paraformaldehyde and dimethylamine hydrochloride. It is converted with sodium acetate and glacial acetic acid into 3,4-dichloro-5-(2-methylene-butyryl)-indole-2-carboxylic acid which, recrystallizes from benzene/acetic acid ethyl ester, melts at 210°–211°. The starting material, 3,4-dichloro-5-butyryl-indole-2-carboxylic acid, is produced as follows:

b. 29 g of 4-chloroindole-2-carboxylic acid (cf. H.N. Rydon et al., J. Chem. Soc. 1955, 3499) are suspended in 400 ml of ether. 15 ml of sulphuryl chloride are added dropwise to this suspension at reflux temperature, the addition being made within 20 minutes while stirring. The reaction mixture is stirred for another 3 hours at the same temperature, then cooled and 100 ml of water are added dropwise. The ether solution is separated from the aqueous solution, the organic phase is washed with water and extracted twice with 100 ml of saturated sodium hydrogen carbonate solution each time. The sodium hydrogen carbonate solution is acidified with concentrated hydrochloric acid to pH 2 and the precipitated free carboxylic acid is filtered off, washed with water and dried in vacuo at 60°. Recrystallization from benzene/acetic held ethyl ester yields pure 3,4-dichloro-indole-2-carboxylic acid which melts at 240°–241°.

c. 11.5 g of the carboxylic acid obtained according to (b) are suspended in 50 ml of nitrobenzene. 7.5 g of butyryl chloride are added to this suspension, the mixture is cooled to 0° and 25 g of pulverized aluminum chloride are added in portions so that the temperature of the reaction mixture does not exceed 10°. The whole is then stirred for another 5 hours at a reaction temperature of 25°. The reaction solution is then poured onto 200 g of ice in 40 ml of concentrated hydrochloric acid, 70 ml of benzene are added and the suspension is well stirred. The precipitate formed is filtered off, dried at 60° in vacuo and recrystallized from dioxan. The 3,4-dichloro-5-butyryl-indole-2-carboxylic acid obtained melts at 271°–272°.

EXAMPLE 4 a. Crude 1-methyl-3,4-dichloro-5-(2-dimethylaminomethyl-butyryl)-indole-2-carboxylic acid hydrochloride is obtained analogously to example 1 (a) starting from crude 1-methyl-3,4-dichloro-5-butyryl-indole-2-carboxylic acid with paraformaldehyde and dimethylamine hydrochloride. The crude product is converted with glacial acetic acid and sodium acetate into 1-methyl-3,4-dichloro-5-(2-methylene-butyryl)-indole-2-carboxylic acid. M.P. 163°–164° (from benzene).

The starting material, 1-methyl-3,4-dichloro-5-butyryl-indole-2-carboxylic acid, is produced as follows:

b. 29 g of 4-chloroindole-2-carboxylic acid (cf. H.N. Rydon et al., J. Chem. Soc. 1955, 3499) are dissolved by gently heating in 300 ml of acetone, 35 ml of dimethyl sulphate are added to this solution and the mixture is added dropwise within 30 minutes while stirring to a lightly boiling suspension of 45 g of finely pulverized potassium carbonate in 150 ml of acetone. The whole is stirred under reflux for another 3 hours. The precipitated salts are then removed from the solution by filtration and the filtrate is concentrated in vacuo. Crude 1-methyl-4-chloroindole-2-carboxylic acid methyl ester remains, to which are added 75 ml of 4N sodium hydroxide solution, 75 ml of water and 50 ml of ethanol. The mixture is refluxed for 30 minutes, cooled, washed with ether and acidified to pH 2 with concentrated hydrochloric acid. The precipitated crystals are filtered off, washed with water and dried in vacuo at 70°. The crude product is recrystallized from dioxan, whereupon the 1-methyl-4-chloroindole-2-carboxylic acid melting at 252°–253° is obtained.

The carboxylic acid obtained is converted with sulphuryl chloride analogously to example 3 (b) into 1-methyl-3,4-dichloro-indole-2-carboxylic acid, M.P. 252°–253° (from dioxan) which is reacted with butyryl chloride analogously to example 1 (b) to form 1-methyl-3,4-dichloro-5-butyryl-indole-2-carboxylic acid (crude product).

EXAMPLE 5 a. Crude 4-methyl-5-(2-dimethylaminomethyl-butyryl)-benzofuran-2-carboxylic acid hydrochloride is obtained analogously to example 1a) starting from 4-methyl-5-butyryl-benzofuran-2-carboxylic acid with paraformaldehyde and dimethylamine hydrochloride. The crude product is converted with sodium acetate in glacial acetic acid into 4-methyl-5-(2-methylene-butyryl)-benzofuran-2-carboxylic acid which melts at 150°–160° (from benzene/acetic acid ethyl ester).

The starting material, 4-methyl-5-butyryl-benzofuran-2-carboxylic acid, is produced as follows:

b. A suspension of 11 g. of 2-methyl-6-hydroxy-benzaldehyde [cf. O. Anselmino, Chem. Ber. 50, 395 (1917)] and 11 g of anhydrous potassium carbonate in 40 ml of methylethyl ketone is stirred, refluxed and, within 15 minutes, 20 g of bromomalonic acid diethyl ester are added dropwise. The reaction mixture is then boiled and stirred for another 7 hours and then concentrated in vacuo. A solution of 10 g of potassium hydroxide in 8 ml of water and 80 ml of ethanol is added to the reside, the reaction mixture is refluxed for 2 hours, cooled, 100 ml of water are added and the ethanol is evaporated in vacuo. The resultant alkaline-aqueous solution is acidified to pH 2–3 with 20 percent sulphuric acid. The precipitated crystalline crude product is filtered off, washed with water, dried in vacuo at 60° and re-crystallized from benzene whereupon the pure 4-methyl-benzofuran-2-carboxylic acid melts at 189°–191°.

The carboxylic acid obtained is converted into 4-methyl-5-butyryl-benzofuran-2-carboxylic acid, M.P. 165°–167° (from benzene) with butyryl chloride in the presence of aluminum chloride analogously to example 1 (b).

EXAMPLE 6

4-Methyl-5-(2-methylene-butyryl)-indole-2-carboxylic acid, M.P. 194°–195° (from benzene) is obtained analogously to example 2 (a) from 4-methyl-indole-2-carboxylic acid [cf. R. Andrisano et al., CA 52, 6313$^e$ (1958); Gazz. chim. ital. 87 949 (1957)] with 2-methylene-butyryl chloride in the presence of aluminum chloride in nitrobenzene.

EXAMPLE 7 a. 1,4-Dimethyl-5-(2-methylene-butyryl)-indole-2-carboxylic acid, M.P. 180°–181° (from acetic acid ethyl ester/benzene) is obtained analogously to example 2 (a) from 1,4-dimethyl-indole-2-carboxylic acid and 2-methylene-butyryl chloride in the presence of aluminum chloride in nitrobenzene.

The starting material, 1,4-dimethyl-indole-2-carboxylic acid, is produced as follows:

b. A suspension of 35 g of potassium carbonate in 100 ml of acetone is stirred at reflux temperature. A solution of 17.5 g of 4-methyl-indole-2-carboxylic acid [c.f. R. Andrisano et al., Gazz, chim. ital. 87,949 (1957)]and 25 ml of dimethyl sulphate in 150 ml of acetone is added dropwise to this suspension within 20 minutes. The reaction mixture is refluxed for 14 hours, cooled, the precipitate is filtered off and washed with acetone. The filtrate is concentrated in vacuo. The residue, crude 1,4-dimethyl-indole-2-carboxylic acid methyl ester, is refluxed for 30 minutes with 120 ml of 2N sodium hydroxide solution and 60 ml of ethanol. The solution is then cooled, the pH is adjusted to 2 and the precipitated crude carboxylic acid is filtered off, washed with water and dried in vacuo at 60°. After recrystallization from acetic acid ethyl ester/dioxan, 1,4-dimethyl-indole-2-carboxylic acid, M.P. 236°–237°, is obtained.

EXAMPLE 8 a. 4.0 g of 5-butyryl-6-methyl-benzofuran-2-carboxylic acid, 0.82 g of paraformaldehyde and 1.64 g of dimethylamino hydrochloride are refluxed for 5 hours in 40 ml of dioxane while stirring. The reaction mixture is then evaporated in vacuo, 5.0 g of sodium acetate as well as 50 ml of glacial acetic acid are added to the crude 5-(2-dimethylaminomethylbutyryl)-6-methyl-benzofuran-2-carboxylic acid hydrochloride obtained and the mixture is refluxed for 2 hours. The glacial acetic acid is then evaporated in vacuo, the residue is taken up in 100 ml of water and the aqueous solution is acidified with concentrated hydrochloric acid to pH 2–3. The hydrochloric acid suspension is stirred for 1 hour at 20°. The precipitated crystals are then filtered off under suction, dissolved in acetic acid ethyl ester, the solution is dried with anhydrous magnesium sulphate and evaporated in vacuo. The residue is recrystallized from a small quantity of acetic acid ethyl ester whereupon 5-(2-methylene-butyryl)-6-methyl-benzofuran-2-carboxylic acid is obtained. M.P. 141°–142°.

The starting compound, 5-butyryl-6-methyl-benzofuran-2-carboxylic acid, is produced as follows:

b. 10.0 g of 6-methyl-benzofuran-2-carboxylic acid [cf. K. von Auwers, Ann. Chem. 408, 255 (1915)] are suspended in 30 ml of nitrobenzene. 28.0 g of aluminum chloride are added to the suspension in portions while cooling with ice so that a reaction temperature of 10° is maintained. 9.0 g of butyryl chloride are then added dropwise within 30 minutes at the same temperature. The mixture is then stirred for 24 hours at 25°, after which it is poured into 300 g of ice and 50 ml of concentrated hydrochloric acid and the hydrochloric acid suspension is extracted twice with 300 ml of ether each time. The combined ether solutions are washed with water and extracted twice with 100 ml of saturated sodium hydrogen carbonate solution each time. The pH of the sodium hydrogen carbonate extract is adjusted to 2–3 with concentrated hydrochloric acid and the suspension formed is stirred for 1 hour at room temperature. The precipitated crystals are filtered off under suction, washed with water and dissolved in acetic acid ethyl ester. The acetic acid ethyl ester solution is dried with anhydrous magnesium sulphate and concentrated in vacuo. Fractional recrystallization of the residue from acetic acid ethyl ester/dioxane yields 5-butyryl-6-methyl-benzofuran-2-carboxylic acid, M.P. 155°–157°.

EXAMPLE 9 a. Starting from 4.6 g of 4,6-dimethyl-5-butyryl-benzofuran-2-carboxylic acid, 1.0 g of paraformaldehyde and 1.75 g of dimethylamine hydrochloride, crude 4,6-dimethyl-5-(2-dimethyl-aminomethyl-butyryl)-benzofuran-2-carboxylic acid hydrochloride is obtained analogously to example 1 (a). It is converted with 5.0 g of sodium acetate and 50 ml of glacial acetic acid into 4,6-dimethyl-5-(2-methylene-butyryl)-benzofuran-2-carboxylic acid which melts at 208°–210° (from ethanol).

b. The starting compound, 4,6-dimethyl-5-butyryl-benzofuran-2-carboxylic acid, is produced analogously to example 1(b) from 12.3 g of 4,6-dimethyl-benzofuran-2-carboxylic acid (cf. F.M. Dean et al., J. Chem. Soc. 1953, 1250–1261) and 10.0 g of butyryl chloride with 25.0 g of aluminum chloride. After recrystallization from benzene/hexane, the 4,6-dimethyl-5-butyryl-benzofuran-2-carboxylic acid melts at 190°–192°.

EXAMPLE 10 a. Starting from 5.6 g of 4-chloro-5-butyryl-benzo[b]thiophene-2-carboxylic acid with 1.2 g of paraformaldehyde and 2.5 g of dimethylamine hydrochloride, crude 4-chloro-5-(2-dimethyl-aminomethyl-butyryl)-benzo[b]thiophene-2-carboxylic acid hydrochloride is obtained analogously to example 1 (a). It is converted with 1.7 g of sodium acetate and 17 ml of glacial acetic acid into 4-chloro-5-(2-methylene-butyryl)-benzo[b]thiophene-2-carboxylic acid which melts at 239°–241° (from ethyl acetate/dioxane).

The 4-chloro-5-butyryl-benzo[b]thiophene-2-carboxylic acid used as starting material is produced as follows:

b. 22.5 g of o-chlorobenzaldehyde are added dropwise within 10 minutes to a boiling mixture of 20.0 g of rhodanine, 37.5 g of anhydrous sodium acetate and 100 ml of glacial acetic acid. The reaction mixture is then stirred for another 20 minutes at the same temperature whereupon it is poured into 3 liters of ice water. The crude 5-(o-chlorobenzylidene)-rhodanine precipitates. The crystals are filtered off under suction and washed with 500 ml of water. The moist product is then added to a solution of 25.0 g of sodium hydroxide in 1.8 liters of water. The reaction mixture is dissolved while stirring, heated to 75° within 10 minutes and kept at this temperature for 10 minutes. The solution is cooled to 10° and 65 ml of concentrated hydrochloric acid are added. The crude o-chloro-a-mercapto-cinnamic acid precipitates. The crude product is filtered off under suction, washed with water and dissolved in 700 ml of ether. The ether solution is dried with anhydrous magnesium sulphate and evaporated in vacuo. The residue is added in portions to a solution of 60 g of iodine in 200 ml of nitrobenzene which has been heated to 180°, the addition being made within 2 minutes. The reaction mixture is stirred for another 2 minutes, then poured onto 1 kg of ice and the suspension obtained is extracted twice with 500 ml of chloroform each time. The chloroform extract is shaken twice with 100 ml of 2N sodium hydroxide solution each time, the aqueous alkaline solution is decolored with active charcoal and saturated sodium sulphite solution, the suspension is filtered and the pH of the filtrate is adjusted with concentrated hydrochloric acid to 2–3. The crude carboxylic acid precipitates. It is filtered off under suction, washed with water and recrystallized from dioxane/acetic acid ethyl ester, whereupon the pure 4-chlorobenzo[b]thiophene-2-carboxylic acid obtained melts at 246°–247°.

c. 9.0 g of the carboxylic acid obtained according to (b) are converted analogously to example 1 (b) into 4-chloro-5-butyryl-benzo[b]thiophene-2-carboxylic acid which melts at 217°–219° (from acetic acid ethyl ester). The conversion is performed according to Friedel-Crafts with 8.0 g of butyryl chloride in the presence of 25.0 g of aluminum chloride.

EXAMPLE 11 a. Crude 6-methyl-5-[(2-dimethylaminomethyl)-propionyl]-benzofuran-2-carboxylic acid hydrochloride is obtained by the process described in example 8 (a) starting from 4.6 g of 6-methyl-5-propionyl-benzofuran-2-carboxylic acid, 0.7 g of paraformaldehyde and 1.9 g of dimethylamine hydrochloride. It is converted with 2.5 g of sodium acetate in 25 ml of glacial acetic acid into 6-methyl-5-(2-methylene-propionyl)-benzofuran-2-carboxylic acid, M.P. 185°–186° (recrystallized from acetic acid ethyl ester).

b. The starting material, 5-propionyl-2-methyl-benzofuran-2-carboxylic acid is produced analogously to example 8 (b) from 6-methyl-benzofuran-2-carboxylic acid (cf. K. von Auwers, Ann. Chem. 408 (1915) 255) with propionyl chloride and aluminum chloride in nitrobenzene. After recrystallization from dioxane, it melts at 180°–182°.

EXAMPLE 12 a. Crude 6-methyl-5-[(2-dimethylaminomethyl)-valeroyl]-benzofuran-2-carboxylic acid hydrochloride is obtained according to example 8 (a) starting from 6-methyl-5-valeroyl-benzofuran-2-carboxylic acid, paraformaldehyde and dimethylamine hydrochloride. It is converted with sodium acetate in glacial acetic acid into 6-methyl-5-(2-methylene-valeroyl)-benzofuran-2-carboxylic acid. M.P. 160°–162° (recrystallized from benzene ethyl acetate).

b. The starting material, 6-methyl-5-valeroyl-benzofuran-2-carboxylic acid is produced analogously to example 8 (b) from 6-methyl-benzofuran-2-carboxylic acid (cf. K. von Auwers, Ann. Chem. 408 (1915) 255) with valeroyl chloride and aluminum chloride in nitrobenzene. It melts at 154°–155° (recrystallized from acetic acid ethyl ester).

EXAMPLE 13 a. Crude 6-methyl-5-[2-dimethylaminomethyl-3-methyl-butyryl]-benzofuran-2-carboxylic acid dihydrochloride is obtained analogously to example 1 (a) starting from 6-methyl-5-(3-methyl-butyryl)-benzofuran-2-carboxylic acid with paraformaldehyde and dimethylamine hydrochloride. It is converted with sodium acetate in glacial acetic acid into 6-methyl-5-(2-methylene-C-methyl-butyryl)-benzofuran-2-carboxylic acid, M.P. 153°–154° (recrystallized from acetic acid ethyl ester).

b. The starting compound, 6-methyl-5-(3-methyl-butyryl)-benzofuran-2-carboxylic acid, is produced analogously to example 8 (b) from 6-methyl-benzofuran-2-carboxylic acid (cf. K. von Auwers, Ann. Chem. 408 (1915) 255) with isovaleroyl chloride and aluminum chloride in nitrobenzene. It melts at 154°–156° (recrystallized from ethyl acetate).

EXAMPLE 14 a. Crude 6-methoxy-5-[(2-dimethylaminomethyl)-propionyl]-benzofuran-2-carboxylic acid hydrochloride is obtained analogously to example 8 (a) starting from 6-methoxy-5-propionyl-benzofuran-2-carboxylic acid, paraformaldehyde and dimethylamine hydrochloride. It is converted with sodium acetate in glacial acetic acid into 6-methoxy-5-(2-methylene-propionyl)-benzofuran-2-carboxylic acid, M.P. 165°–167° (recrystallized from benzene).

b. The starting compound, 6-methoxy-5-propionyl-benzofuran-2-carboxylic acid, is produced analogously to example 8 (b) from 6-methoxy-benzofuran-2-carboxylic acid (cf. W. Will and P. Beck, Ber. 19, 1777 (1886)) with propionyl chloride and aluminum chloride in nitrobenzene. It melts at 218°–220° (recrystallized from ethyl acetate).

EXAMPLE 15 a. Crude 6-methoxy-5-[(2-dimethylaminomethyl)-butyryl]-benzofuran-2-carboxylic acid hydrochloride is obtained analogously to example 8 (a) starting from 6-methoxy-5-butyryl-benzofuran-2-carboxylic acid, paraformaldehyde and dimethylamine hydrochloride. It is converted with sodium acetate in glacial acetic acid into 6-methoxy-5-(2-methylene-butyryl)-benzofuran-2-carboxylic acid, M.P. 153°–154° (recrystallized from benzene).

b. The starting compound, 6-methoxy-5-butyryl-benzofuran-2-carboxylic acid is produced from 6-methoxy-benzofuran-2-carboxylic acid (cf. W. Will and P. Beck, Ber. 19, 1777 (1886) with butyryl chloride and aluminum chloride in nitrobenzene. It melts at 189°–190° (recrystallized from ethyl acetate).

EXAMPLE 16 a. Starting from 6-ethoxy-5-butyryl-benzofuran-2-carboxylic acid, paraformaldehyde and dimethylamine hydrochloride, crude 6-ethoxy-5-[(2-dimethylaminomethyl)-butyryl]-benzofuran-2-carboxylic acid hydrochloride is obtained analogously to example 8 (a). It is converted with sodium acetate in glacial acetic acid into 6-ethoxy-5-(2-methylene-butyryl)-benzofuran-2-carboxylic acid, M.P. 143°–144° (recrystallized from ethanol water).

b. The starting compound, 6-ethoxy-5-butyryl-benzofuran-2-carboxylic acid, is produced analogously to example 8 (b) from 6-ethoxy-benzofuran-2-carboxylic acid (cf. W. Will and P. Beck, Ber. 19 (1886) 1777) with butyric acid chloride and aluminum chloride in nitrobenzene. The compound melts at 203°–205° (recrystallized from ethanol).

EXAMPLE 17 a. Crude 6-ethyl-5-[(2-dimethylaminomethyl)-butyryl]-benzo-furan-2-carboxylic acid hydrochloride is obtained analogously to example 8 (a) from 6-ethyl-5-butyryl-benzofuran-2-carboxylic acid, paraformaldehyde and dimethylamine hydrochloride. It is converted with sodium acetate in glacial acetic acid into 6-ethyl-5-(2-methylene-butyryl)-benzofuran-2-carboxylic acid, M.P. 121°–122° (recrystallized from benzene).

b. The starting compound, 6-ethyl-5-butyryl-benzofuran-2-carboxylic acid is produced analogously to example 8 (b) from 6-ethyl-benzofuran-2-carboxylic acid with butyric acid chloride and aluminum chloride in nitrobenzene. 6-Ethyl-5-butyryl-benzofuran-2-carboxylic acid melts at 152°–153° (recrystallized from acetic acid ethyl ester).

6-Ethyl-benzofuran-2-carboxylic acid is also produced as follows:

c. 50.0 g of m-ethylphenol, 55.0 g of maleic acid and 100 ml of concentrated sulphuric acid are slowly heated to 130° while stirring and stirring is continued at this temperature for 20 minutes. The reaction mixture is then poured onto 2 kg of ice and extracted twice with 500 ml of ether each time. The combined other extracts are washed with 200 ml of water and 200 ml of concentrated aqueous sodium hydrogen carbonate solution, dried over magnesium sulphate and concentrated. The residue, crude 7-ethyl coumarin, is used as crude product.

d. 30.4 g of 7-ethyl coumarin are dissolved in 40 ml of chloroform and 29.0 g of bromine in 20 ml of chloroform are added dropwise while stirring. The temperature of the reaction mixture is kept between 20° and 25° by occasional cooling in an ice bath. The reaction mixture is then stirred for another 20 minutes at room temperature and concentrated at 50° under reduced pressure. The residue is added in portions to a solution of 80.0 g of potassium hydroxide in 160 ml of ethanol, which solution has been heated to 30°, and the reaction temperature is kept at 30°–40° by cooling. The reaction mixture is then stirred for 30 minutes at room temperature and for 30 minutes at room temperature and for 30 minutes at 80°, after which it is poured into 1 liter of ice water. The aqueous, alkaline solution is washed twice with 300 ml of ether each time, acidified with concentrated hydrochloric acid to pH 2–3 and the precipitated crude product is filtered off under suction. The crude product is recrystallized from ethanol and dried in vacuo at 80° whereupon the 6-ethyl-benzofuran-2-carboxylic acid obtained melts at 152°–154°.

EXAMPLE 18 a. Crude 6-chloro-5-[(2-dimethylaminomethyl)-butyryl]-benzofuran-2-carboxylic acid is obtained analogously to example 8 (a) starting from 1.0 g of 6-chloro-5-butyryl-benzofuran-2-carboxylic acid, 0.16 g of paraformaldehyde and 0.385 g of dimethylamine hydrochloride. It is converted with sodium acetate in glacial acetic acid into 5-(2-methylene-butyryl)-6-chloro-benzofuran-2-carboxylic acid. Recrystallized from benzene/acetic acid ethyl ester, it melts at 188°–189°.

The starting compound, 6-chloro-5-butyryl-benzofuran-2-carboxylic acid, is produced as follows:

b. 80 g of 2-chloro-4-hydroxy-butyrophenone (cf. Belgian Pat. No. 612,755) are slurried in 400 ml of water, and 100 ml of 4N sodium hydroxide solution are added. A clear solution is formed. 20 g of sodium borohydride are added and the whole is stirred for 5 hours at room temperature. The solution is then cooled with ice and hydrochloric acid is added dropwise until a pH of 3–4 has been attained. The suspension is stirred for another half hour, and then the crystals obtained of 3-chloro-4(1-hydroxybutyl)-phenol are filtered off under suction. They are used immediately in the crude state.

c. The moist crystal mass of 3-chloro-4-(1-hydroxybutyl)-phenol is added to a solution of 200 g of sodium hydroxide in 500 ml of water, the solution formed is heated to 70° and 150 g of chloroform are added dropwise within 2 hours. During the addition, the temperature of the reaction mixture must be 70°–80°. The mixture is stirred for 20 minutes at 70° and then cooled to room temperature. The yellow crystal mass which precipitates, which consists of the sodium salt of 3-chloro-4-(1-hydroxy-butyl)-2-formyl-phenol, is filtered off under suction. The pH of the filtrate is adjusted to 2–3 with concentrated hydrochloric acid, the filtrate is extracted twice with 100 ml of ether each time and the combined ether extracts are washed with 100 ml of water, after which they are stirred for 10 hours with 200 ml of concentrated sodium hydrogen sulphite solution. The crystals obtained, which consist of the bisulphite adduct of 3-chloro-4-(1-hydroxy-butyl)-6formyl-phenol, and filtered off under suction and washed first with 50 ml of ether and then with 50 ml of water. The crystals are then slurried in 100 ml of water, 100 ml of ether are poured in, 15 ml of concentrated hydrochloric acid are added and the mixture is stirred for 2 hours whereupon the crystals dissolve. The ether phase is removed, washed with 50 ml of water, dried over magnesium sulphate and concentrated. The residue consists of 6.5 g of 3-chloro-4-(1-hydroxy-butyl)-6-formyl phenol, which is used in the crude state.

d. 6.5 g of crude 3-chloro-4-(1-hydroxy-butyl)-6-formyl phenol are dissolved in 30 ml of methylethyl ketone, 4.0 g of potassium carbonate are added and the mixture is refluxed while stirring. 8 g of bromomalonic acid diethyl ether are then added dropwise within 10 minutes whereupon the reaction mixture is refluxed for 5 hours while stirring. The solvent is then distilled off, the residue is taken up in 50 ml of water, concentrated hydrochloric acid is added until pH 3 is attained and the mixture is extracted twice with 100 ml of ether each time. The ether solutions are washed with 100 ml of water, dried over magnesium sulphate and concentrated. A solution of 5 g of potassium hydroxide, 5 ml of water and 50 ml of ethanol is added to the residue and the mixture is refluxed for 2 hours. 200 ml of water are then added and the aqueous-alkaline solution is washed twice with 100 ml of ether each time. The aqueous solution is acidified with concentrated hydrochloric acid and extracted twice with 100 ml of ether each time. The ether extracts are dried and concentrated. On standing, the residue crystallizes and is recrystallized from benzene. In this way, 1.8 g of 6-chloro-5-(1-hydroxy-butyl)-benzofuran-2-carboxylic acid, M.P. 194°–196°, are obtained.

e. 1.8 g of 6-chloro-5-(1-hydroxy-butyl)-benzofuran-2-carboxylic acid are dissolved in 20 ml of acetone, the solution is cooled to 0° and a solution of 0.54 g of $CrO_3$ in 0.5 ml of concentrated sulphuric acid and 1.5 ml of water is added. The reaction mixture is stirred for 30 minutes, then distributed with 100 ml of ether and 100 ml of water, the ether layer is dried over magnesium sulphate and concentrated. The residue is recrystallized from benzene/ethyl acetate and yields 1.2 g of 5-butyryl-6-chloro-benzofuran-2-carboxylic acid which melts at 214°–215°.

EXAMPLE 19 a. Starting from 3.6 g of 4-chloro-5-butyryl-benzofuran-2-carboxylic acid, 0.48 g of paraformaldehyde and 1.15 g of dimethylamine hydrochloride, crude 4-chloro-5-[2-(dimethylamino-methyl)-butyryl]-benzofuran-2-carboxylic acid hydrochloride is obtained analogously to example 8 (b). It is converted with 2.0g of sodium acetate and 20 ml of glacial acetic acid into 4-chloro-5-(2-methylene-butyryl)-benzofuran-2-carboxylic acid, M.P. 156°–158° (recrystallized from benzene/ethyl acetate).

The 4-chloro-5-butyryl-benzofuran-2-carboxylic acid used as starting material is produced as follows:

b. The crude sodium salt of 3-chloro-4-(1-hydroxy-butyl)-2-formyl phenol obtained in example 18 (c) as side product is slurried in 200 ml of water, the pH is adjusted to 3 with hydrochloric acid and the slurry is extracted twice with 100 ml of ether each time. The ether extracts are washed with 100 ml of water, dried over magnesium sulphate and concentrated. The residue, crude 3-chloro-4-(1-hydroxy-butyl)-2-formyl phenol (30 g) is used in the crude state.

c. 8.2 g of 4-chloro-5-(1-hydroxy-butyl)-benzofuran-2-carboxylic acid are obtained analogously to example 18 (d) from 30 g of 3 chloro-4-(1-hydroxy-butyl)-2-formyl phenol with 20 g of potassium carbonate and 30 g of bromomalonic acid diethyl ester in 100 ml of methylethyl ketone. Recrystallized from benzene/acetic acid ethyl ester, the compound melts at 173°–175°.

d. 4.5 g of 4-chloro-5-butyryl-benzofuran-2-carboxylic acid are obtained analogously to example 18 (e) from 7.6 g of 4-chloro-5-(1-hydroxy-butyl)-benzofuran-2-carboxylic acid in 80 ml of acetone with a solution of 2.2 g of chromium trioxide in 6 ml of water and 2 ml of concentrated sulphuric acid. Recrystallized from benzene/ethyl acetate, the compound melts at 133°–134°.

EXAMPLE 20 a. 7.2 g of 3,6-dimethyl-5-butyryl-benzofuran-2-carboxylic acid methyl ester and 3.3 g of dimethylamine hydrochloride are melted and the melt is stirred for 2 hours at 140°. The melt obtained consists of crude 3,6-dimethyl-5-(2-dimethylamino-methyl-butyryl)-benzofuran-2-carboxylic acid methyl ester hydrochloride. This is refluxed for 10 minutes with a solution of 80 ml of 1 N sodium hydroxide solution and 80 ml of ethanol and, after dilution with 300 ml of ice water, it is acidified to pH 3 with concentrated hydrochloric cid. The precipitate formed is filtered off under suction and, after drying in vacuo, it is purified by chromatographing over silica gel. The 3,6-dimethyl-5-(2-methylene-butyryl)-benzofuran-2-carboxylic acid, when recrystallized from benzene/heptane, melts at 152°–154°.

The 3,6-dimethyl-5-butyryl-benzofuran-2-carboxylic acid methyl ester used as starting material is produced as follows:

b. 10.4 g of 3,6-dimethyl-5-butyryl-benzofuran-2-carboxylic acid are added in portions over a period of 30 minutes to a boiling slurry of 7 g of potassium carbonate in 80 ml of acetone. Simultaneously a solution of 5 ml of dimethyl sulphate in 30 ml of acetone is added to the reaction mixture from a dropping funnel. On completion of the addition, the mixture is refluxed for another 3 hours while stirring, then cooled, the precipitate is filtered off under suction and is washed with 50 ml of acetone. The filtrate and washing liquor are combined and evaporated and the residue is recrystallized from carbon tetrachloride/heptane. The 3,6-dimethyl-5-butyryl-benzofuran-2-carboxylic acid methyl ester formed melts at 101°–105°.

c. The 3,6-dimethyl-5-butyryl-benzofuran-2-carboxylic acid is obtained analogously to example 8 (b) from 3,6-dimethyl-benzo-furan-2-carboxylic acid (cf. Fries and Finkewirth, Chem. Ann. 362, (1908) 50) with butyric acid chloride and aluminum chloride in nitrobenzene. The compound melts at 185°–187° (recrystallized from benzene/ethyl acetate).

EXAMPLE 21 a. 0.5 g of 6-methyl-5-[2-(methylthiomethyl)-butyryl]-benzofuran-2-carboxylic acid are dissolved in 5 ml of acetone, 0.5 g of dimethyl sulphate are added and the solution is left to stand for 3 days at room temperature. The solvent is then evaporated under reduced pressure and the residue, consisting of crude 6-methyl-5-[2-(dimethyl-thioniummethyl)-butyryl]-benzofuran-2-carboxylic acid methyl sulphate, is dissolved in 5 ml of water, 2.5 ml of saturated sodium hydrogen carbonate solution are added to the solution formed and the reaction mixture is heated for 1 hour in a steam bath. The cooled solution is then acidified to pH 2–3 with hydrochloric acid, stirred for half an hour at room temperature and the precipitated crystals are filtered off under suction, dried and recrystallized from benzene. 0.3 g of 6-methyl-5-[2-(methylene)-butyryl]-benzofuran-2-carboxylic acid, M.P. 141°–142°, are obtained.

The 6-methyl-5-[2-(methyl - thiomethyl)-butyryl]-benzofran-2-carboxylic acid used as starting material is produced as follows:

b. 6.8 g of 6-methyl-5-[2-(dimethylaminomethyl)-butyryl]-benzofuran-2-carboxylic acid hydrochloride (M.P. 187°–188°) are dissolved in 200 ml of water, 4.04 g of sodium hydrogen carbonate are added in portions to the solution and a constant stream of methyl mercaptan is bubbled through the mixture. While continuing the introduction of methyl mercaptan, the mixture is heated to 90° and is kept for 2 hours at this temperature whereupon the stream of gas is cut off and the solution is cooled. The pH of the solution is adjusted to 2–3 with concentrated hydrochloric acid and the precipitate formed is filtered off under suction, dried in vacuo and recrystallized from a small amount of acetic acid ethyl ester. In this way, 5.2 g of 6-methyl-5-[2-(methylthiomethyl)-butyryl]-benzofuran-2-carboxylic acid, M.P. 151°–152°, are obtained.

EXAMPLE 22 a. 10 ml of water and 5 ml of a saturated sodium hydrogen carbonate solution are added to 6-methyl-5-[2-(methylsulphonyl-methyl)-butyryl]-benzofuran-2-carboxylic acid and then the solution is refluxed for 1½ hours. It is allowed to cool and the solution is acidified to pH 2–3 with concentrated hydrochloric acid. The mixture is stirred for another 30 minutes and then the precipitated crystals are filtered off under suction, dried in vacuo and recrystallized from benzene. In this way, 0.5 g of 6-methyl-5-(2-methylene-butyryl)-benzofuran-2-carboxylic acid, M.P. 141°–142° are obtained.

The 6-methyl-5-[2-methyl-sulphonylmethyl)-butyryl]-benzo-furan-2-carboxylic acid used as starting material is produced as follows:

b. 3.1 g of 6-methyl-5-[2-(methylthiomethyl)-butyryl]-benzofuran-2-carboxylic acid (production see example 21) are slurried in 15 ml of glacial acetic acid and 3.6 g of 40 percent peracetic acid are so added dropwise to the mixture while cooling with ice that the reaction temperature remains between 15° and 20°. The reaction mixture is then stirred for 15 hours at room temperature and the precipitated crystal mass is filtered off under suction. Recrystallized from ethyl acetate/dioxane, 2.8 g of 6-methyl-5-[2-(methyl-sulphonylmethyl)-butyryl]benzofuran-2-carboxylic acid, M.P. 201°–203°, are obtained.

EXAMPLE 23 a. A solution of 6-methyl-5-(2-methylene-butyryl)-benzofuran-2-carboxylic acid methyl ester in 5 ml of ethanol is heated to reflux temperature, 2 ml of 1N sodium hydroxide solution are added and the mixture is refluxed for another minute whereupon it is diluted with 70 ml of ice water. The solution is then washed with 50 ml of ether, the pH of the aqueous-alkaline phase is adjusted to 2–3 with hydrochloric acid and the mixture is stirred for 30 minutes. The precipitate formed is filtered off under suction, dried in vacuo and recrystallized from benzene. In this way, 0.4 g of 6-methyl-5-(2-methylene-butyryl)-benzofuran-2-carboxylic acid, M.P. 141°–142°, are obtained.

The 6-methyl-5-(2-methylene-butyryl)-benzofuran-2-carboxylic acid methyl ester used as starting material can be produced as follows:

b. 5.0 g of anhydrous potassium carbonate are slurried in 20 ml of acetone and the slurry is brought to reflux temperature. A solution of 7.5 g of 6-methyl-5-butyryl-benzofuran-2-carboxylic acid and 3.75 ml of dimethyl sulphate in 70 ml of acetone is added dropwise to this suspension within 15 minutes whereupon the reaction mixture is refluxed for another hour and cooled. Insoluble salts are then filtered off, the acetone solution is concentrated and the residue is recrystallized from methanol. 7.3 g of 6-methyl-5-butyryl-benzofuran-2-carboxylic acid methyl ester, M.P. 91°–92, are obtained in this way.

c. 5.5 g of the 6-methyl-5-butyryl-benzofuran-2-carboxylic acid methyl ester produced in (b) above are refluxed for 24 hours with 1.2 g of paraformaldehyde and 3.2 g of dimethylamine hydrochloride in 12 ml of methanol. The methanol is then evaporated, 30 ml of acetic acid ethyl ester are added to the residue which is then left to stand for 2 days in a refrigerator. The crystal mass so obtained is then filtered off and recrystallized from acetonitrile whereupon 2.4 g of 6-methyl-5-[2-(dimethylaminomethyl)-butyryl]-benzofuran-2-carboxylic acid methyl ester hydrochloride, M.P. 176°–178°, are obtained.

d. 1.2 g of the 6-methyl-5-[2-(dimethylaminomethyl)-butyryl]-benzofuran-2-carboxylic acid methyl ester hydrochloride are refluxed for 2 hours with 1.2 g of sodium acetate and 20 ml of glacial acetic acid. The glacial acetic acid is then evaporated in a rotary evaporator and the residue is distributed between 100 ml of water and 100 ml of ether. After washing the ether phase with 100 ml of water, it is removed, dried with 100 ml of saturated sodium hydrogen carbonate solution over magnesium sulphate and concentrated. The residue is recrystallized from methanol and yields 0.6 g of 6-methyl-5-(2-methylene-butyryl)-benzofuran-2-carboxylic acid methyl ester, M.P. 85°–86°.

EXAMPLE 24 a. 1.2 g of 6-methyl-5-(2-bromo-2-methyl-propionyl)-benzofuran-2-carboxylic acid in 80 ml of benzene are stirred with 1.8 g of mercury acetate for 4 hours under reflux. The reaction mixture is then poured into a mixture of 100 g of ice and 10 ml of concentrated hydrochloric acid, well stirred and the precipitate formed, consisting of mercury bromide and mercury chloride, is filtered off. The residue is washed with 100 ml of acetic acid ethyl ester. The filtrate is then put into a separating funnel, the organic phase is removed, washed with 50 ml of water, dried over magnesium sulphate and concentrated. The residue is recrystallized from benzene and 6-methyl-5-(2-methylene-propionyl)-benzofuran-2-carboxylic acid, M.P. 185°–186°.

The starting material, 6-methyl-5-(2-bromo-2-methyl-propionyl)-benzofuran-2-carboxylic acid, is produced as follows:

b. 3.0 g of 6-methyl-5-isobutyryl-benzofuran-2-carboxylic acid are dissolved in 30 ml of glacial acetic acid and 0.7 ml of bromine are added dropwise within 15 minutes to this solution at 50°. The whole is stirred for another 15 minutes at the same temperature, after which the glacial acetic acid is evaporated in a rotary evaporator and the residue is recrystallized from ethyl acetate/dioxane. 3.65 g of 6-methyl-5-(2-bromo-2-methyl-propionyl)-benzofuran-2-carboxylic acid, M.P. 231°–233°, are obtained in this way.

c. The 6-methyl-5-isobutyryl-benzofuran-2-carboxylic acid is produced analogously to example 8 (b) from 6-methyl-benzofuran-2-carboxylic acid (cf. K. von Auwers, Ann. Chem. 408, (1915) 255) with isobutyryl chloride and aluminum chloride in nitrobenzene. It melts at 174°–175° (recrystallized from methylethyl ketone).

The following Examples illustrate the production of tablets and dragees:

EXAMPLE 25

1,000 g of 4-chloro-5-(2-methylene-butyryl)-indole-2-carboxylic acid are mixed with 550 g of lactose and 292 g of potato starch, the mixture is moistened with an aqueous solution of 8 g of gelatine and granulated through a sieve. After drying, 60 g of potato starch, 60 g of talcum, 10 g of magnesium stearate and 20 g of colloidal silicon dioxide are mixed in and the mixture is pressed into 10,000 tablets each weighing 200 mg and containing 100 mg of active substance. If desired, the tablets can be grooved for better adaptation of the dosage.

EXAMPLE 26

A granulate is produced from 1,000 g of 5-(2-methylene-butyryl)-benzofuran-2-carboxylic acid, 379 g of lactose and the aqueous solution of 6 g of gelatine. After drying, the granulate is mixed with 10 g of colloidal silicon dioxide, 40 g of talcum, 60 g of potato starch and 5 g of magnesium stearate and the mixture is pressed into 10,000 dragee cores. These are then coated with a concentrated syrup consisting of 533.5 g of crystallized saccharose, 20 g of shellac, 75 g of gum arabic, 250 g of talcum, 20 g of colloidal silicon dioxide and 1.5 g of dyestuff, and dried. The dragees obtained each weigh 240 mg and contain 100 mg of active substance.

What we claim is:

1. The method of producing diuresis and saluresis in mammals which method comprises administering to said mammal a diuretically and saluretically effective amount of a compound of the Formula I

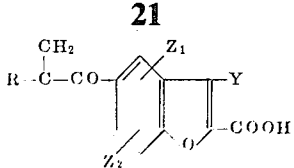

(I)

wherein
R is hydrogen or lower alkyl;
Y is hydrogen, methyl, fluoro, chloro or bromo; and each of $Z_1$ and $Z_2$ taken individually is hydrogen, lower alkyl, lower alkoxy, fluoro, chloro or bromo; or of a pharmaceutically acceptable salt of said compound with a base.

2. The method according to claim 1 wherein said compound is 6-methyl-5-(2-methylene-propionyl)-benzofuran-2-carboxylic acid.

3. The method according to claim 1 wherein said compound is 6-methyl-5-(2-methylene-propionyl)-benzofuran-2-carboxylic acid.

4. The method according to claim 1 wherein said compound is 6-methyl-5-(2-methylene-valery 1 )-benzofuran-)-benzofuran-2-carboxylic acid.

5. The method according to claim 1 wherein said compound is 6-methyl-5-(2-methylene-3-methyl-butyryl)-benzofuran-2-carboxylic acid.

6. The method according to claim 1 wherein said compound is 3,6-dimethyl-5-(2-methylene-butyryl)-benzofuran-2-carboxylic acid.

7. The method according to claim 1 wherein said compound is 6-ethyl-5-(2-methylene-butyryl)-benzofuran-2-carboxylic acid.

8. The method according to claim 1 wherein said compound is 6-methoxy-5-(2-methylene-butyryl)-benzofuran-2-carboxylic acid.

9. The method according to claim 1 wherein said compound is 4-chloro-5-(2-methylene-butyryl)-benzofuran-2-carboxylic acid.

10. The method according to claim 1 wherein said compound is 6-chloro-5-(2-methylene-butyryl)-benzofuran-2-carboxylic acid.

11. The pharmaceutical composition comprising a combination in dosage unit form of a pharmaceutical carrier and an amount sufficient to produce a diuretic and a saluretic effect upon administration of said dosage unit form of a compound of Formula I

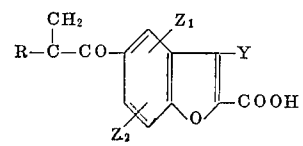

(I)

wherein
R is hydrogen or lower alkyl;
Y is hydrogen, methyl, fluoro, chloro or bromo; and each of $Z_1$ and $Z_2$ taken individually is hydrogen, lower alkyl, lower alkoxy, fluoro, chloro or bromo; or of a pharmaceutically acceptable salt of said compound with a base.

12. The pharmaceutical composition according to claim 11 wherein said compound is 6-methyl-5-(2-methylene-butyryl)-benzofuran-2-carboxylic acid.

13. The pharmaceutical composition according to claim 11 wherein said compound is 6-methyl-5-(2-methylene-propionyl)-benzofuran-2-carboxylic acid.

14. The pharmaceutical composition according to claim 11 wherein said compound is 6-methyl-5-(2-methylene-valeryl ) 2-carboxylic acid.

15. The pharmaceutical composition according to claim 11 wherein said compound is 6-methyl-5-(2-methylene-3-methyl-butyryl)-benzofuran-2-carboxylic acid.

16. The pharmaceutical composition according to claim 11 wherein said compound is 3,6-dimethyl-5-(2-methylene-butyryl)-benzofuran-2-carboxylic acid.

17. The pharmaceutical composition according to claim 11 wherein said compound is 6-ethyl-5-(2-methylene-butyryl)-benzofuran-2-carboxylic acid.

18. The pharmaceutical composition according to claim 11 wherein said compound is 6-methoxy-5-(2-methylene-butyryl)-benzofuran-2-carboxylic acid.

19. The pharmaceutical composition according to claim 11 wherein said compound is 4-chloro-5-(2-methylene-benzofuran-2-carboxylic acid.

20. The pharmaceutical composition according to claim 11 wherein said compound is 6-chloro-5-(2-methylene-butyryl)-benzofuran-2-carboxylic acid.

* * * * *

UNITED STATES PATENT OFFICE
CERTIFICATE OF CORRECTION

Patent No. 3,681,502          Dated August 1, 1972

Inventor(s) Janos Zerginyi et al.

It is certified that error appears in the above-identified patent and that said Letters Patent are hereby corrected as shown below:

Column 22, claim 14, line 24, after "-valeryl)"

insert -- -benzofuran- --.

Signed and sealed this 19th day of March 1974.

(SEAL)
Attest:

EDWARD M. FLETCHER, JR.          C. MARSHALL DANN
Attesting Officer                Commissioner of Patents 4-2660 DIV III

PO-1050
(5/69)

UNITED STATES PATENT OFFICE
CERTIFICATE OF CORRECTION

Patent No. 3,681,502   Dated August 1, 1972

Inventor(s) JANOS ZERGENYI ET AL

It is certified that error appears in the above-identified patent and that said Letters Patent are hereby corrected as shown below:

Cover page, left column, insert

-- [30] Foreign Application Priority Data

July 28, 1967   Switzerland   10764/67

September 29, 1967   Switzerland   13637/67  --;

after "[72] Inventors: Janos" delete "Zerginyi"

and insert -- ZERGENYI --.

Signed and sealed this 5th day of November 1974.

(SEAL)
Attest:

McCoy M. GIBSON JR.
Attesting Officer

C. MARSHALL DANN
Commissioner of Patents df